Patented Apr. 12, 1949

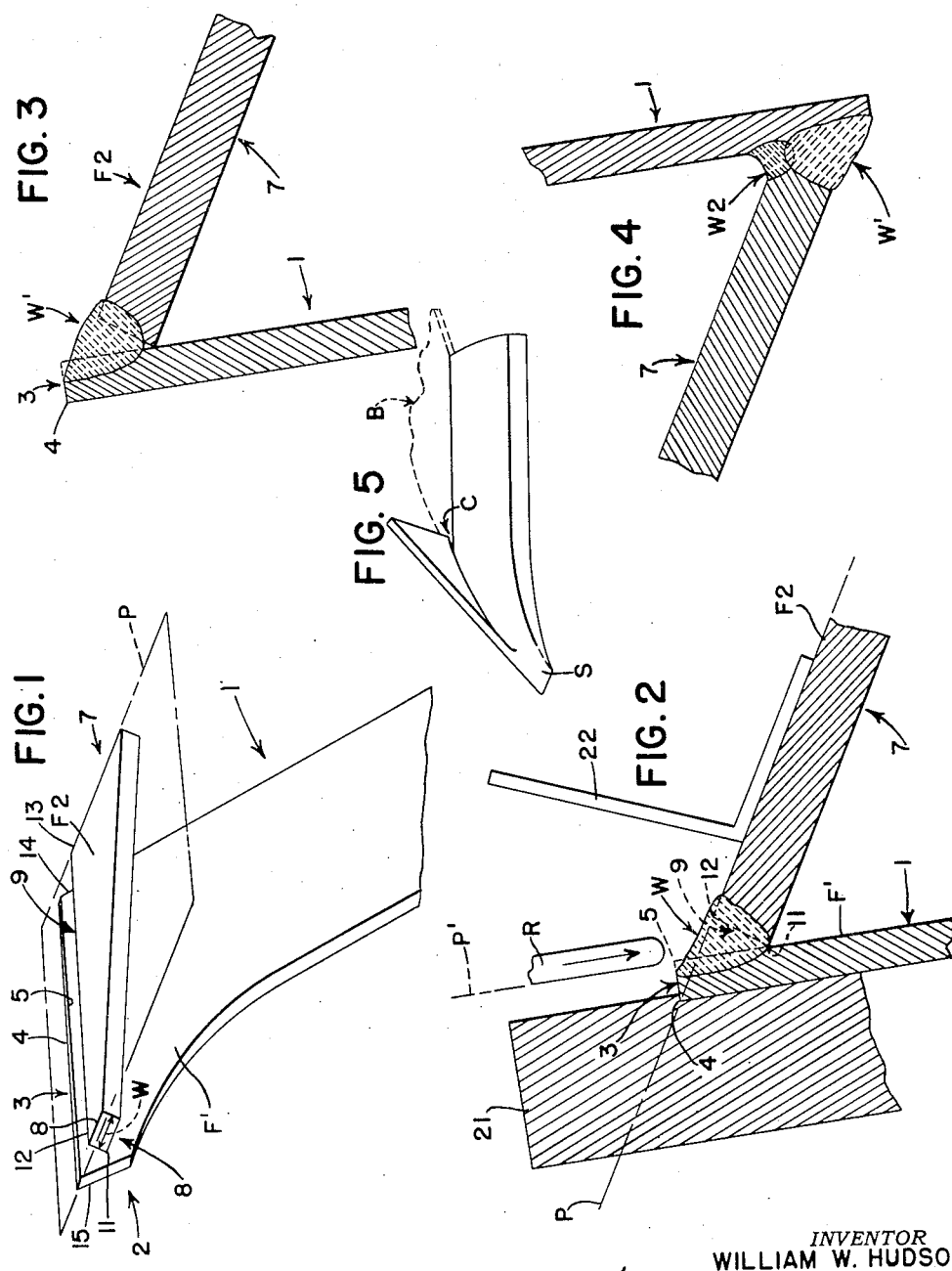

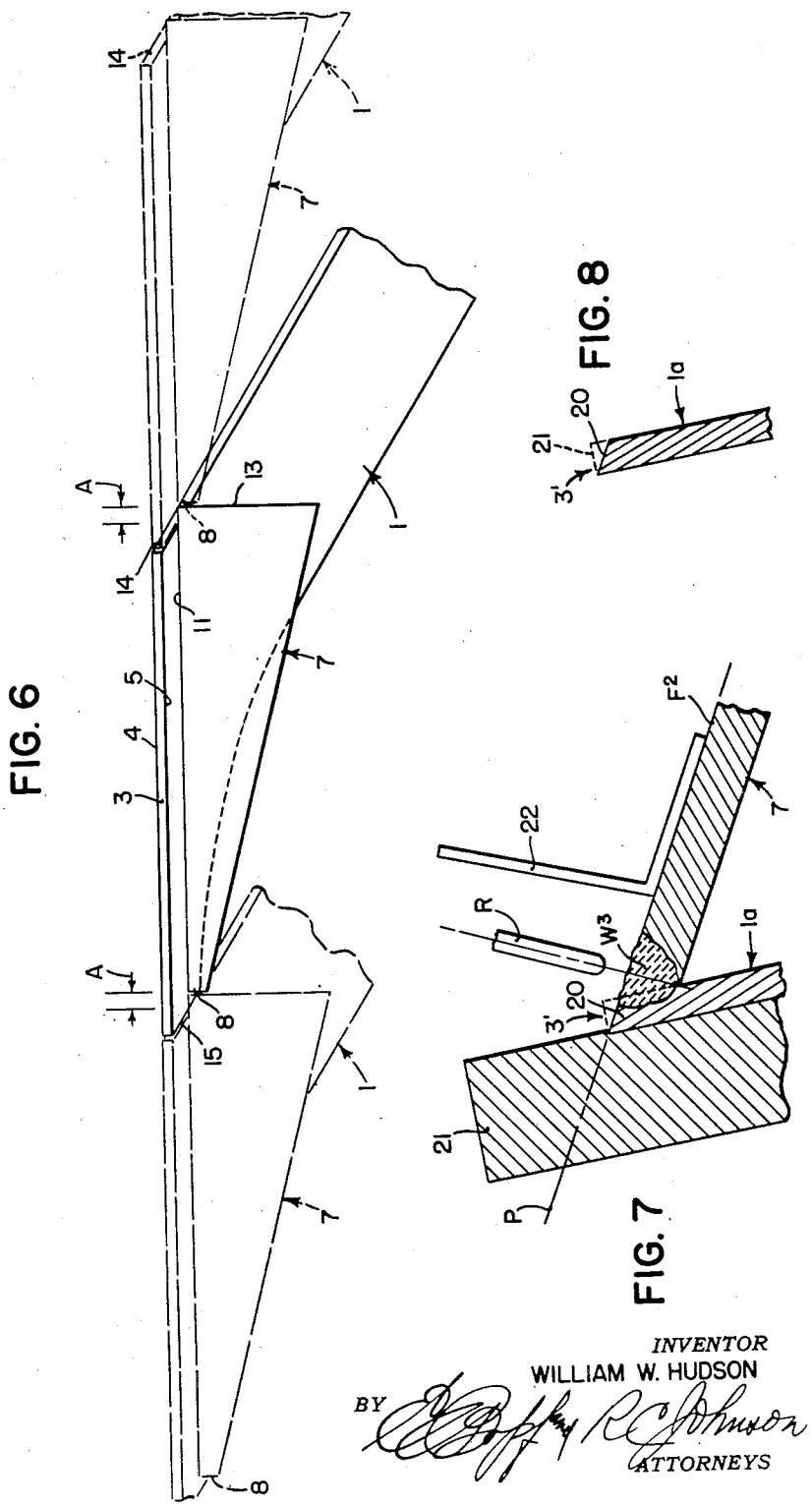

2,467,311

UNITED STATES PATENT OFFICE 2,467,311

METHOD OF ELECTRICALLY WELDING PLOWSHARES

William W. Hudson, Moline, Ill., assignor to Deere & Company, Moline, Ill., a corporation of Illinois Application August 10, 1946, Serial No. 689,683

5 Claims. (Cl. 219—10)

1

The present invention relates generally to a method of making agricultural machines and more particularly to ground working tools, such as plows and the like.

The object and general nature of the present invention is the provision of a new and improved method of making a plowshare. More particularly, it is an important feature of this invention to provide a new and improved method of making a plowshare by welding together two relatively flat parts in such a way that the resulting plowshare is not only stronger than conventional plowshares but is more economical to manufacture and can be made at an increased rate of production. Specifically, it is a feature of this invention to provide a new and improved method of making a plowshare wherein the landside is welded to the share blade by arc welding performed in such a way that the share is stronger than conventional lap-welded shares and, further, is less expensive to manufacture and requires a smaller number of subsequent operations to bring the share to its final shape.

More particularly, it is an important feature of this invention to produce a welded plowshare by welding a landside blank to a share blade blank with the parts at an acute angle arranged with the outer face of the landside disposed in the plane that passes through the outermost corner of the adjacent edge of the shareblade, in conjunction with fusion welding the two parts together but without fusing the outer corner of the share blade, leaving this corner intact, while fusing the inner portions of the edge of the share blade so as to bring the zone of weld, including sufficient filler metal to fill in the space between the share blade and landside, to a position substantially flush with said plane. This procedure produces a share blank in which the landside edge of the share remains sharp but without requiring any great amount of flow of the metal during the forging and final shaping of the share.

These and other objects and advantages of the present invention will be apparent to those skilled in the art after a consideration of the following detailed description, taken in conjunction with the accompanying drawings in which one preferred form of the present invention has been illustrated.

In the drawings:

Figure 1 is a perspective view showing the share blade and landside blanks or plates in the positions they occupy during the welding of the parts together.

Figure 2 is a cross section illustrating the way

2 in which the welding is accomplished, as by a single pass.

Figures 3 and 4 are views similar to Figure 2 showing the manner of welding the two parts or blanks together in a two pass operation.

Figure 5 is a perspective view of the completed plowshare.

Figure 6 shows how a series of pairs of share blades and landsides may be welded in a continuous operation.

Figures 7 and 8 are sectional views, similar to Figure 2, illustrating another method of carrying out the principles of the present invention, wherein one edge of the landside is milled to produce a beveled edge prior to the welding operation.

Referring now to the drawings, the reference numeral 1 indicates a share blade part in the form of a flat plate or blank. The part 1 is shaped generally like the share blade of a completed plowshare, having a nose or point portion 2 and a landward edge section 3 which preferably is substantially perpendicular to the general plane of the share blade 1. The edge 3 includes an outer corner 4 and an inner corner 5 to which further reference will be made below. The other part is indicated by the reference numeral 7 and comprises a generally triangular plate or blank which forms the landside of the completed share. This part has a forward or nose section 8, an edge section 9 having inner and outer corners 11 and 12 and a rear edge 13. The width $w$ of the nose section (Figure 1) is sufficient to provide adequate stock to form the relative thick point S of the completed share (Figure 5).

According to the preferred manner of securing the two parts 1 and 7 together, the parts are positioned, as by welding machine clamps or electrodes (not shown) in the relative positions shown in Figures 2 and 6, that is, with the part 7 making an acute angle with respect to the main body of the share blade 1, and with the inner corner 11 of the part 7 substantially in contact with the inner face $F^1$ of the share blade 1 a short distance below the edge 3 of the share blade, and with the outer face $F^2$ of the part 7 disposed in a plane P which is the plane that passes through the outermost corner 4 of the share blade edge 3. This disposes the inner corner 5 of the edge 3 a short distance above the plane P of the landside 7. As shown in Figures 1 and 6, the rear edge 13 of the landside 7 lies a short distance A (Figure 6) back of the rear edge 14 of the blade 1, so as to permit the landside of the completed share to engage under the moldboard B (as shown at C in Figure 5) in the completed plow bottom, and the narrow edge 8 of the landside 7 lies substantialy the same distance rearwardly of the edge 15 of the blade point 2. This permits any number of pairs (blade and landside) to be assembled in a series, as shown in Figure 6, for example, and welded in a continuous pass, as in an automatic welding machine, since the nose point 15 of one pair of blanks overlaps the rear end 13 of the landside of the adjacent pair of blanks.

With the parts 1 and 7 thus positioned in the welding machine, with the part 7 generally horizontal (preferably occupying the relative positions shown in Figure 2 where the lower edge of the drawing is parallel to a horizontal line), and the part 1 approximately vertical, the welding machine is adjusted so as to bring the welding rod R into position adjacent the edges 3 and 9 in about the position illustrated in Figure 2, namely, with the welding rod R substantially parallel to the share blade 1 and substantially tangent at one side to the plane $P^1$ of the inner face $F^1$ of the blade. Suitable barriers 21 and 22, which may be sheet metal parts or may be backing members, if desired, are provided so that when the two parts 1 and 7 are connected by a shielded arc welding process, the slag and flux provided as an incident to the use of such process are retained in position to provide the desired protection and isolation of the arc flame and of the molten metal at the zone of weld. Electric current passing between the welding rod R and the two parts 1 and 7 produces the welding heat necessary to fuse the adjacent portions of the parts to be welded together as well as the heat necessary to melt the filler rod R and maintain the molten pool of metal which forms on the work at the arc location, and which is protected by the above mentioned slag and flux. The welding rod R, the current, and the rate of travel of the rod or electrode, and other factors, are preferably adjusted so as to produce a fusion area or zone of weld W (Figure 2) such that the inner corner 5 of the share blade edge 3 is fused, or "burned down," the zone of weld extending into the adjacent portions of the edge 9 of the landside 7 and also into the inner portions of the share blade 1 adjacent and below the inner edge 5, but the zone of fusion does not extend outwardly to the outer corner 4 of the edge 3, which edge lies substantially in the plane P of the outer face $F^2$ of the landside 7. As shown in Figure 2, the fused metal thus fills in the space between the edge 9 at the adjacent side of the share blade end portion so as to provide a fillet weld that extends substantially flush with said plane P and preferably slightly above. By virtue of this arrangement, wherein the outer corner 4 and adjacent portions of the share blade edge are left intact and unfused, and wherein the weld metal is supplied to fill up the space between the edge portions 3 and 9, a firm sharp corner, at 4, is provided for the landward edge of the completed share but without requiring that much metal be moved during the subsequent heating and shaping operations that take place in making the completed share after the parts 1 and 7 have been welded together, as described.

As shown in Figure 2, the weld W is preferably extended through the thickness of the landside 7 at one pass, but if desired, the parts 1 and 7 may be secured together by a two pass weld, as illustrated in Figures 3 and 4. As shown in Figure 3, the first weld $W^1$ may be made exactly as described above in connection with Figure 2 except that the zone of weld is not extended entirely through the landside 7 but only partially therethrough, preferably slightly more than half way. Then the parts 1 and 7 are turned over, or placed in another fixture, and a second fillet weld $W^2$ is made on the inside of the parts 1 and 7 in the manner shown in Figure 4. Preferably, the second weld $W^2$ is made to overlap the first weld $W^1$.

Figures 7 and 8 show another method in which the principles of the present invention have been incorporated. According to this form of the invention, before the share blade blanks 1a are welded to the landside blanks 7, each edge 3' of the share blade blanks 1a are milled or otherwise treated to produce a beveled edge 20 by removing the stock indicated at 21 (Figure 8). The edge 20 is disposed at such angle to the general plane of the share blade blank that the edge 20 lies substantially in the plane P, which is the plane that passes through the face or surface $F^2$ of the landside blank 7. When the section 21 is removed it is not necessary to position the welding rod R so as to bear on the corner 6; instead, the welding rod R is placed in the angular position shown in Figure 7 and the welding operations are conducted so that the weld material $W^3$ (Figure 7) lies substantially flush with the plane P, thus making it unnecessary to take care of even the slight amount of excess material above the plane P shown in Figure 2.

While I have shown and described above the preferred method and structure in which the principles of the present invention have been incorporated, it is to be understood that my invention is not to be limited to the particular details shown and described above, but that, in fact, widely different methods and means may be employed for carrying out the broader aspects of my invention.

What I claim, therefore, and desire to secure by Letters Patent is:

1. The method of making a plowshare blank for use in a plowshare of the type having a landside and a share blade, which comprises the steps of providing a landside part and a share blade part, each of electrically conductive material, positioning said landside and share blade parts at an acute angle with the corner of the edge of one disposed along the side of the other part spaced from but sufficiently close to the edge thereof that the outer corner of the edge of said other part lies substantially in the extended plane of the outer face of said one part, providing sufficient heat so as to fuse a portion of said one part, including the inner corner of the edge of said other part but not the outer corner thereof, and the adjacent portion of said one part, and supplying sufficient filler metal to the fused portions of said parts to fill in the space between the adjacent edges of said parts at least up to said plane.

2. The method of making a blank from which to form a plowshare, which method includes the steps of providing a landside part and a share blade part from flat plate stock of electrically conductive material, the landside part being formed of thicker stock than said blade part, positioning said landside and share blade parts at an acute angle with the inner corner of the edge of the landside part disposed substantially in contact with the inner face of the share blade part and spaced a sufficient distance inwardly of the adjacent corner of the share blade part so that the outer corner of the edge of the share blade part lies substantially in the extended plane of the outer face of the landside part, and connecting said parts by a fillet weld which is substantially flush with said plane and which extends from the outer side to the inner side of said parts.

3. The method set forth in claim 2, further characterized by positioning an electrode at the outer side of said parts outwardly of said edges and in a location, during the welding operation, substantially tangent to the extended plane of the inner face of the share blade part so as to fuse the adjacent inner corner of said share blade part, the inner edge of said landside part and the adjacent portion of the inner face of the share blade part, and supplying sufficient filler metal to the zone of weld to fill in the space between said edges.

4. The method of making a blank from which to form a plowshare, which includes the steps of providing a landside part and a share blade part from flat plate stock of electrically conductive material, forming a beveled edge on the share blade part, positioning said landside and share blade parts at an acute angle with respect to each other and in such a position that the inner corner of the landside part substantially engages the adjacent face of the share blade part at points spaced from the adjacent corner of the share blade beveled edge, whereby the beveled edge of the share blade part lies substantially in the extended plane of the outer face of the other part, and connecting said parts by a fillet weld which lies generally inwardly of said beveled edge but which extends outwardly to a point substantially flush with said plane.

5. The method of making a plurality of plowshare blanks, each of which consists of a landside blank and a share blade blank, both formed of flat plate stock of electrically conductive material, said blanks being welded together at an acute angle with the rear end of the landside blank extending a distance beyond the rear end of the share blade blank, which method comprises providing a plurality of pairs of landside and share blade blanks in which the length of each landside blank is substantially the same as the length of the landside edge of the share blade blank, assembling and holding said landside and share blade blanks at said angle and with the rear end of each landside blank extending beyond the rear end of the associated share blade blank, overlapping the forward portion of the nose of the next adjacent share blade blank and lying substantially in abutting relation with the forward end of the next adjacent landside blank, and then welding the blanks of each pair together in substantially a continuous pass.

WILLIAM W. HUDSON.

REFERENCES CITED

The following references are of record in the file of this patent:

UNITED STATES PATENTS

| Number | Name | Date |
| --- | --- | --- |
| 499,061 | Van Brunt | June 6, 1893 |
| 775,424 | Jarmin | Nov. 22, 1904 |
| 2,280,337 | McKee | Apr. 21, 1942 |

OTHER REFERENCES

The Welding Encyclopedia, eleventh edition, 1943, pages 66 and 735.

The Welding Engineer Publishing Company, 506 South Wabash Avenue, Chicago, Illinois.